United States Patent [19]

Helmstädter

[11] Patent Number: 5,280,902
[45] Date of Patent: Jan. 25, 1994

[54] CONVEYING DEVICE WITH CONTINUOUS CONVEYOR BELTS FOR, IN PARTICULAR, SHEETS OF PAPER OR SIMILAR MATERIALS

[75] Inventor: Maximilian Helmstädter, Villingen-Schwenningen, Fed. Rep. of Germany

[73] Assignee: Mathias Bauerle GmbH, St. Georgen, Fed. Rep. of Germany

[21] Appl. No.: 901,410

[22] Filed: Jun. 19, 1992

[30] Foreign Application Priority Data

Jun. 21, 1991 [DE] Fed. Rep. of Germany ....... 4120469

[51] Int. Cl.$^5$ ............................................. B65H 29/50
[52] U.S. Cl. ................................... 271/198; 198/812; 414/794.4
[58] Field of Search .............. 198/812; 271/200, 198; 414/794.4

[56] References Cited

U.S. PATENT DOCUMENTS 1,572,582 2/1926 Tytus ................................. 198/812
2,477,830 8/1949 Sandbert ............................. 271/68

FOREIGN PATENT DOCUMENTS 2600990 1/1988 France ............................... 198/812

OTHER PUBLICATIONS

Expando-Yeyor (Model 439) Prospectus-May 22, 1953 Farquhar Conveyors.

Primary Examiner—David H. Bollinger
Assistant Examiner—Carol Wallace
Attorney, Agent, or Firm—McGlew and Tuttle

[57] ABSTRACT

A conveying device for sheets of paper, or similar materials, with some continuous conveyor belts (8 and 9) which are led over localized drive rollers (18 and 19) and also over localized return rollers (6, 7) and then over additional mutually displaceable turn-around rollers (27, 28, 29 and 30). The supporting frame includes a supporting guide track which runs between the return rollers (6, 7) and the drive rollers (18 and 19). The drive rollers (18 and 19) are mounted in a plane lying above the supporting guide track (1). A short sliding carriage (24) is provided as an adjustable component of the supporting frame, the carriage being adjustable, in an infinitely variable manner, and fixable in position on the upper side of the supporting guide track (1) between the drive rollers (18 and 19) and the return rollers (6, 7) by guiding elements and clamping elements. The drive rollers (18 and 19), the return rollers (6, 7) and the turn-around rollers (27, 28, 29 and 30) are, in each case, mounted in pairs on both sides of the supporting guide track (1) and are provided with conveyor belts (8 and 9) which run synchronously.

6 Claims, 4 Drawing Sheets

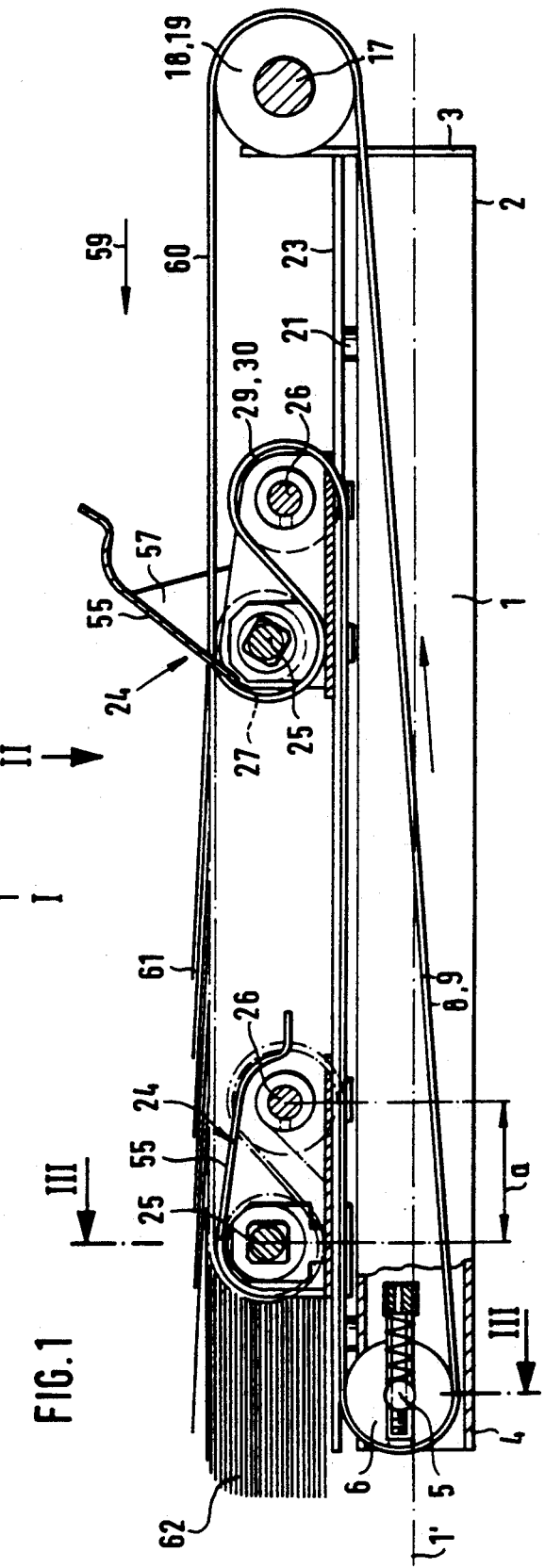
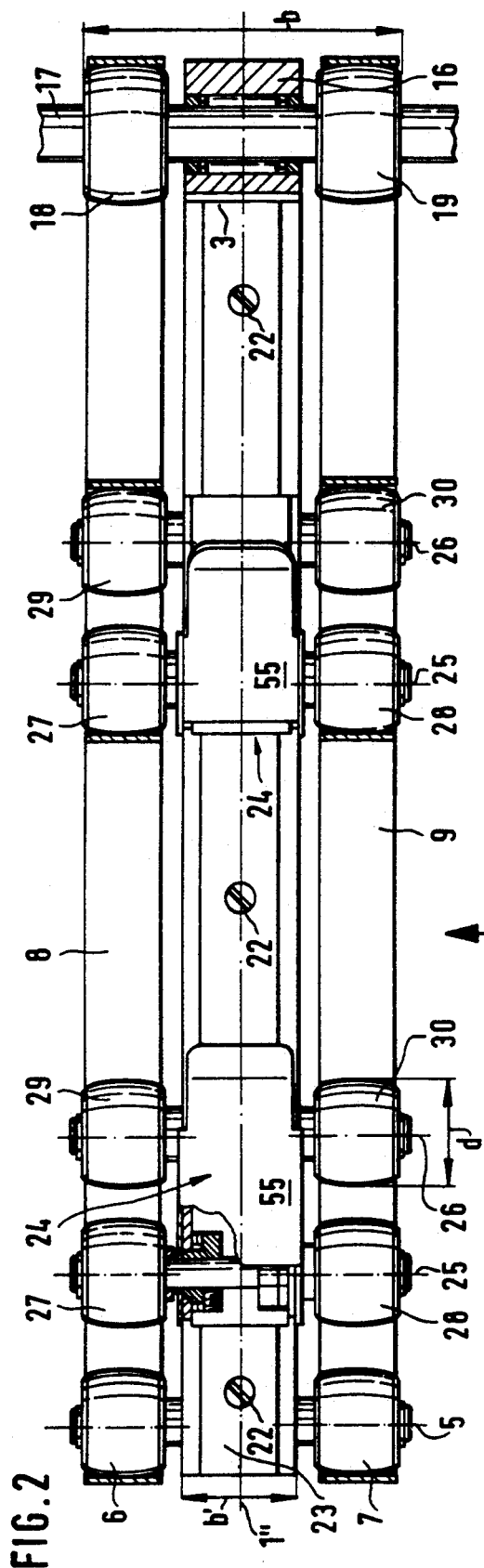
FIG.1
FIG.2

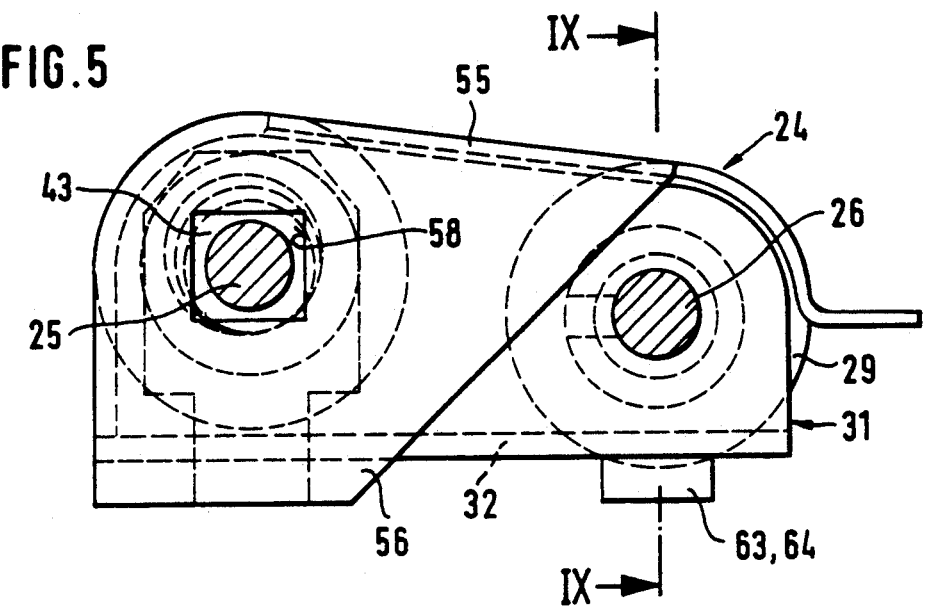
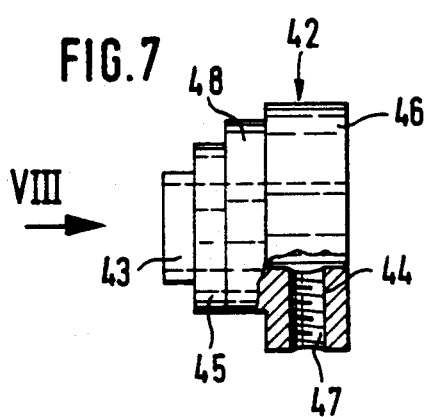
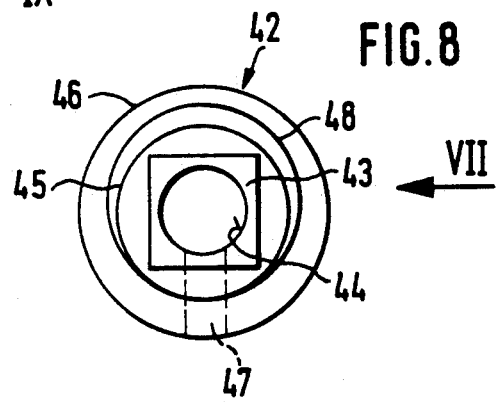
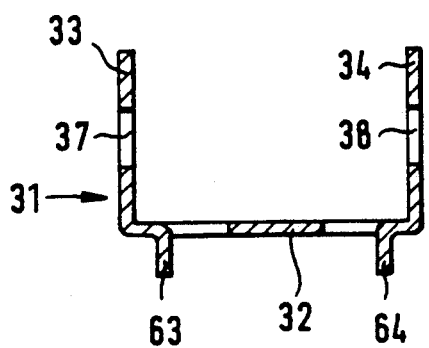

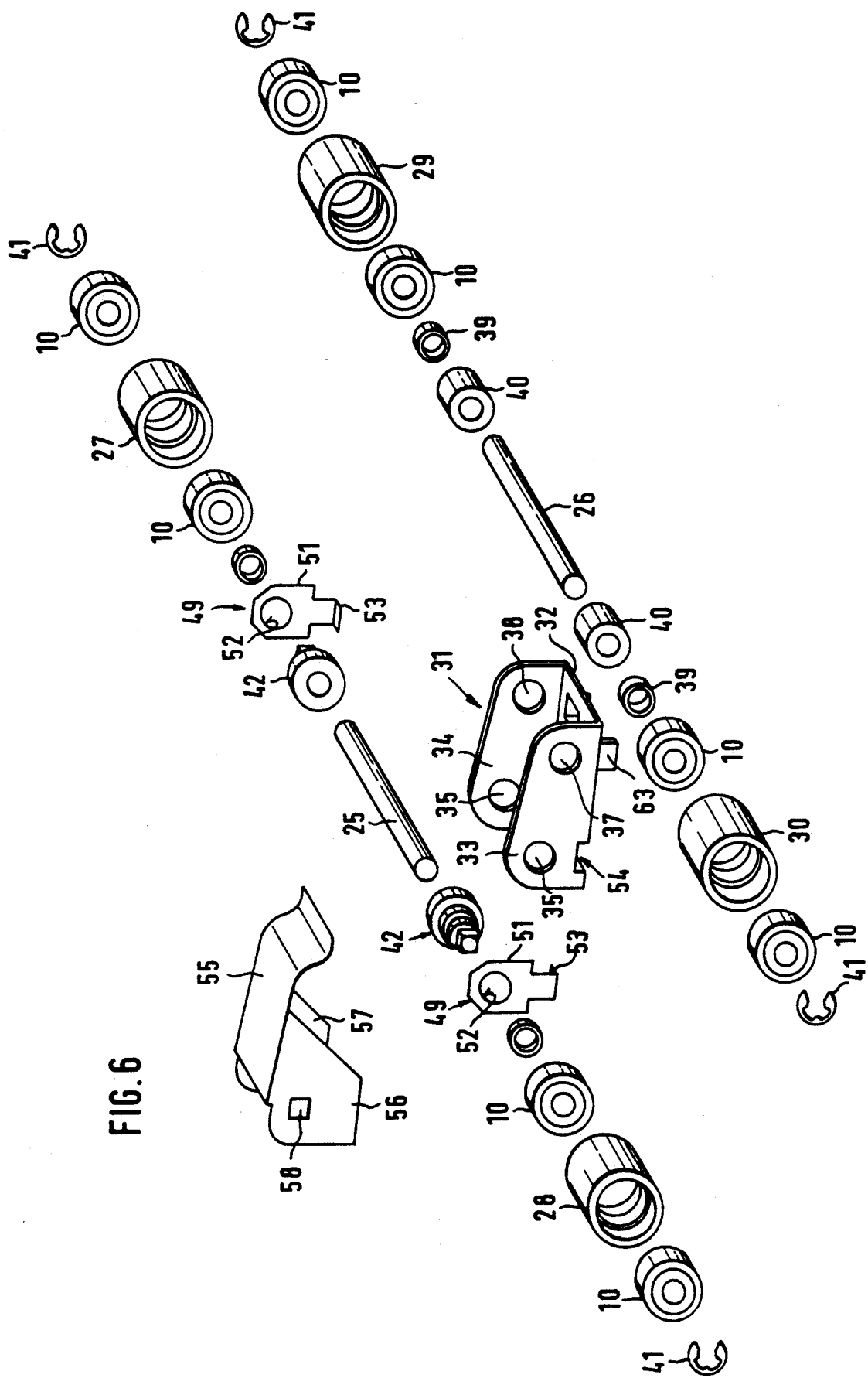

CONVEYING DEVICE WITH CONTINUOUS CONVEYOR BELTS FOR, IN PARTICULAR, SHEETS OF PAPER OR SIMILAR MATERIALS

FIELD OF THE INVENTION

The invention is concerned with a conveying device for sheets of paper, or similar materials, which has several continuous conveyor belts which are led over drive rollers on a drive shaft which is mounted in a localized manner at one end of an essentially horizontal supporting frame and are then led over return rollers on a shaft, which is provided with bearings, which is also arranged in a localized manner under, and at a fixed distance from, the drive shaft at the other end of the supporting frame and are then led over additional turn-around rollers which are mounted on two shafts, which are provided with bearings, which are mounted on a supporting component of the frame which is adjustable in the longitudinal direction of the supporting frame, whereby one of the shafts, which are provided with bearings, belonging to the adjustable supporting component of the frame is located in the plane of the drive shaft and the sections of the conveyor belt which run between the turn-around rollers of this shaft, which is provided with bearings, and the drive rollers form horizontal conveying segments, and whereby the second shaft, which is provided with bearings, belonging to the supporting component of the frame is mounted, together with its turn-around rollers, underneath these conveying segments.

BACKGROUND OF THE INVENTION

A conveying device of the type in accordance with the description is already known (U.S. Pat. No. 2,477,830) which serves to stack, in a continuous manner and in the form of a spatially fixed pile, the printed boards or large sheets ejected by a printing machine which could otherwise be transported and stacked only by at least two workers. In this connection, it is possible to transport individual sheets of paper as well as consecutive sheets and also sheets which mutually overlap one another in a manner resembling scales. This conveying device has a number of continuous conveyor belts which are led synchronously over a common drive roller, a common return roller and two turn-around rollers, the latter being mounted in an adjustable component of the supporting frame. This component of the supporting frame is mounted on the side of the localized turn-around rollers in an essentially (or tendentially) adjustable supporting frame which can be adjusted in a longitudinal direction and, therefore, represents an extension of the supporting frame. The two adjustable turn-around rollers are, in each case, mounted at the opposing terminal segments of the adjustable component of the supporting frame and are mounted so that their distance from one another corresponds approximately to the length by which the supporting frame can be maximally extended by means of the component of the supporting frame. In this conveying device, it is, therefore, not possible to adjust the conveying segments of the conveyor belts to a length which is as large as, or smaller than, the length of the supporting frame. In this connection, moreover, we are dealing with a relatively large and very expensive device in terms of large scale fabrication for large and heavy printed sheets so that it cannot be considered for applications in the office sphere for bridging short distances from the machine in question. In addition, the threaded spindles provided for the longitudinal adjustment of the supporting frame component, which are necessary because of the size and weight of the supporting frame component, inflate not only the price but they also make fabrication complicated and expensive.

SUMMARY AND OBJECTS OF THE INVENTION

In contrast to this arrangement, the conveying device in accordance with the invention is capable of being used for the horizontal transportation of smaller sheets of paper, e.g. of the DIN A4 or DIN A3 size, from a machine ejecting the sheets of paper to a machine which further processes the sheets of paper in such a way that the horizontal length of the conveying segment of the conveying device can be adjusted to the various distances between the two machines in question.

Thus the object underlying the invention is to provide, in a light form of construction, a conveying device of the type designated at the beginning, which can be operated in the simplest possible way, for use in the office sphere, for which the conveying distance covered can be adjusted to lengths which are shorter than the total length of the supporting frame.

In accordance with the invention, this task is accomplished by combining the following features:

a) the supporting frame consists of a supporting guide track which runs in the plane of the return rollers between these and the drive rollers;

b) the drive rollers are mounted in a plane located above the supporting guide track;

c) the adjustable component of the frame is fashioned in the form of a short sliding carriage, the length of which corresponds to about 2.5 times the diameter of one of the turn-around rollers and is capable of being adjusted, in an infinitely variable manner, and then fixed in position by means of guiding elements and clamping elements onto the upper side of the supporting guide track between the drive rollers and the return rollers;

d) the drive rollers, the return rollers and the turn-around rollers are, in each case, mounted in pairs on both sides of the supporting guide track and are provided with two conveyor belts which run synchronously;

e) the two parallel shafts of the turn-around rollers, which are provided with bearings, are mounted in the sliding carriage at a certain distance from one another which corresponds, at the most, to 1.5 times the diameter of one of the turn-around rollers.

The special advantage of this conveying device in accordance with the invention comprises the feature that, because of its light and compact type of construction, it is capable of being operated with ease and can be used universally in the office sphere for the processing of smaller size papers. It is also adjustable, in a very simple manner, to provide different lengths for the conveying distance covered and can be used, for example, between two machines, which process sheets of paper, which are mounted at varying distances from one another whereby the conveying distance covered, i.e. the effective conveying segment, can in each case, be adjusted in an infinitely variable manner to lie between a minimal length amounting to only a few centimeters and a maximum length comprising virtually the entire length of the supporting guide track.

In addition, the invention has the particular advantage that a relatively wide conveying web (on which the sheets of paper to be transported are present in good numbers and are conveyed reliably) can be achieved with two synchronously running conveyor belts using one single, relatively narrow, supporting guide track together with the adjustable, narrow sliding carriage mounted thereon.

Further features of the invention are disclosed which are particularly advantageous as they relate not only to a form of construction which permits simple operation but also to a functionally reliable design of the adjustment mechanism and fixing device, as the case may be, for the sliding carriage.

The various featurs of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a partially sectional lateral view I of a conveying device for sheets of paper which is based on FIG. 2;

FIG. 2 is a plan view II which is based on FIG. 1;

FIG. 5 is a sectional view taken along V—V line of FIG. 4;

FIG. 6 is an exploded view of the individual parts of the sliding carriage;

FIG. 7 is a partially sectional lateral view of a bush bearing the view being taken along line VIII of FIG. 8;

FIG. 8 is the frontal view VIII which based on FIG. 7;

FIG. 9 is a sectional representation taken along line IX—IX, of FIG. 5, without the shaft, which is provided with bearings, together with the two turn-around rollers but without the tensioning lever.

DETAILED DESCRIPTION OF THE PREFERRED EMBODIMENT

Figure 3:
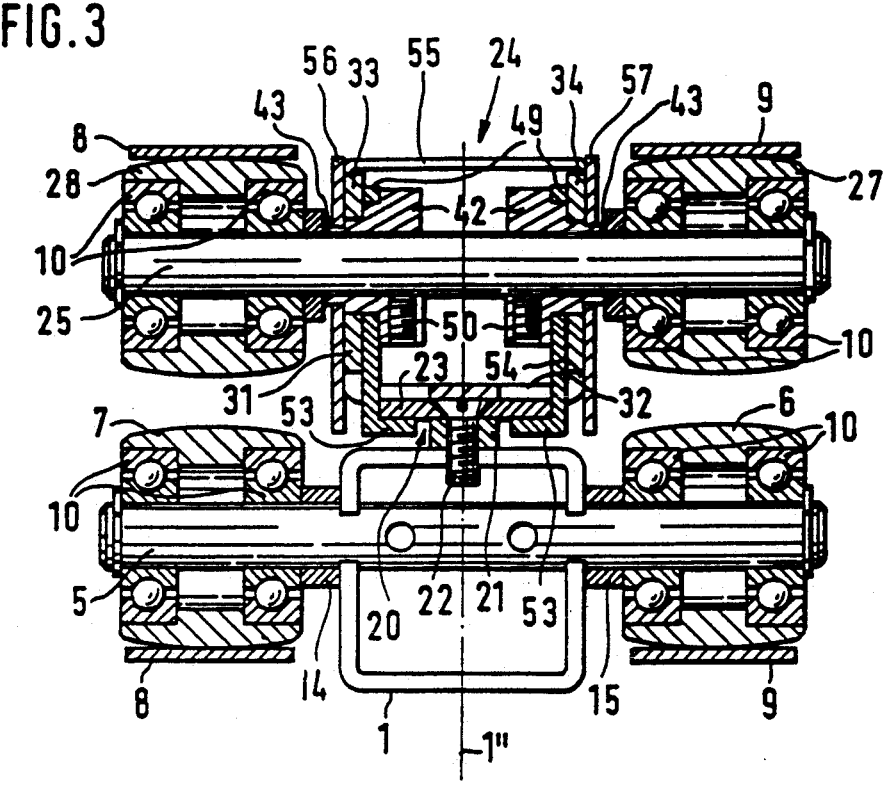
FIG. 3 is a sectional view taken along line III—III of FIG. 1.
Figure 4:
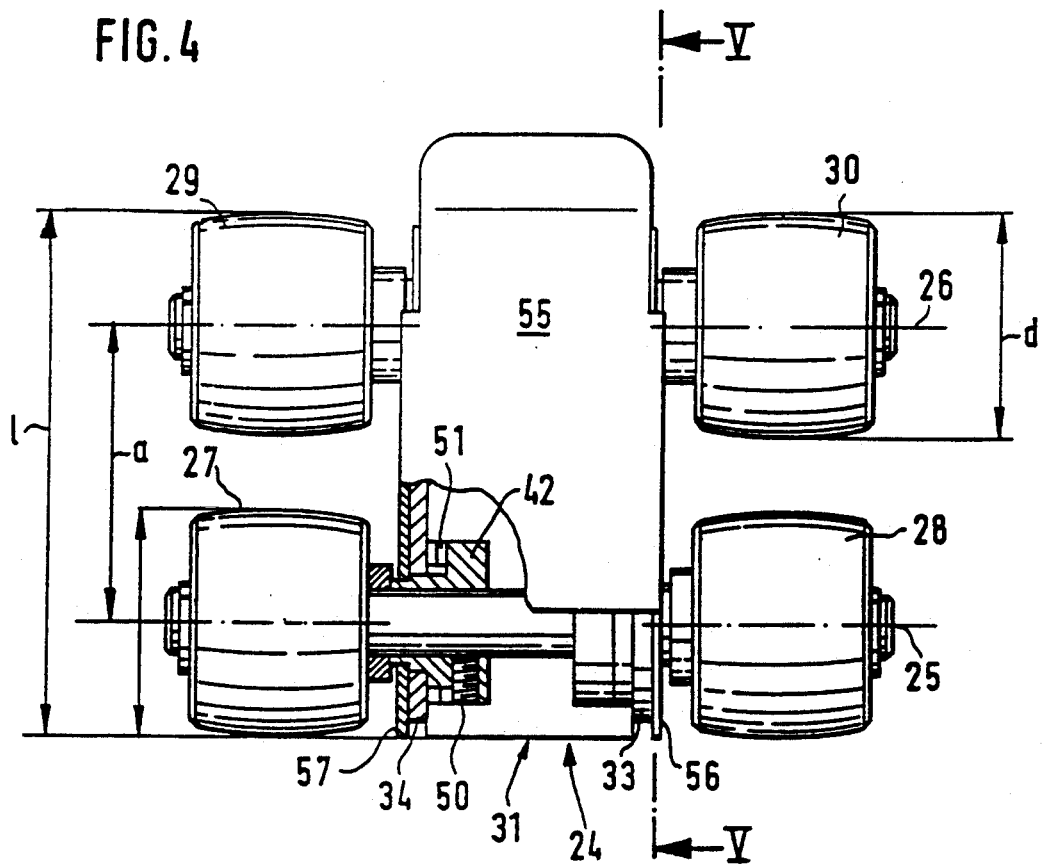
FIG. 4 is partially sectional plan view showing the sliding carriage, which is provided with two pairs of turn-around rollers.

The conveying device for sheets of paper, or similar materials, which is portrayed in the drawings has, as the supporting element, a horizontal guide track 1 formed from a rectangular tube, the guide track being provided with a vertical supporting plate 3 attached frontally at its extremity 2 which rises above the supporting guide track 1. A horizontal shaft 5, which is provided with bearings, is mounted in the opposite terminal section 4 of this supporting guide track 1 and runs in a transverse direction to it above its horizontal mid-plane 1' (see FIG. 3). This shaft 5, which is provided with bearings, is provided with, in each case, a return roller 6 and 7 on both sides of the supporting guide track 1. The shaft 5, which is provided with bearings is, to a certain extent, capable of movement in a spring-like manner in the longitudinal direction of the supporting guide track 1 so that the conveyor belts 8 and 9, which are led over the return rollers 6 and 7, are kept under tension.

As can be seen from FIG. 3, the two return rollers 6 and 7 are mounted, using roller bearings 10, in an easily rotatable manner on the shaft 5, which is provided with bearings, and are held at a certain lateral distance of a few mm from the supporting guide track 1 by means of spacing collars 14 and 15 so that the conveying device acquires an adequate total width b which corresponds to about three times the width b' of the supporting guide track 1.

A drive shaft 17 is mounted in a rotatable manner in a plane lying above the supporting guide track 1 in a bearing block 16 attached to the upper end of the supporting plate 3. The drive shaft is connected to a rotating drive unit, which is not shown, and drive rollers 18 and 19 are mounted, in a non-slipping manner, on the shaft on both sides of the supporting guide track 1 and the bearing block 16, as the case may be.

A clamped strip 23 is mounted, in the form of a T-shaped guide profile 20, on several spacing collars 21 mounted in the vertical central plane 1" on the upper side of the supporting guide track 1 by means of screws 22. A sliding carriage 24 with two shafts 25 and 26 (which are provided with bearings) which run parallel to the drive shaft 17 or, as the case may be, the shaft 5, which is provided with bearings, is mounted in a longitudinally adjustable manner on the clamped strip.

This sliding carriage 24 is adjustable, in an infinitely variable manner, on the supporting guide track 1 between the drive shaft 17 and the shaft 5, which is provided with bearings, belonging to the return rollers 6 and 7. The sliding carriage 24 is made as short as possible in order to achieve an adjustable distance, which is as large as possible, within the supporting guide track 1. The shafts 25 and 26, which are provided with bearings, are mounted as close together as possible. The sliding carriage 24 is shown in two different operational positions in FIG. 1 and FIG. 2 whereby, in the position on the left, it is shown fixed in a non-displaceable manner and, in the position on the right, it is shown fixed in a non-bolted fashion, i.e. displaceably.

Two turn-around rollers 27 and 28, together with 29 and 30, are, in each case, mounted by means of roller bearings 10 on both sides of the sliding carriage 24 or, as the case may be, the supporting guide track 1 on, in each case, the two shafts 25 and 26, which are provided with bearings, whereby, for easier understanding, the turn-around rollers 27 and 28 are designated the first turn-around rollers and the turn-around rollers 29 and 30 are designated the second turn-around rollers in the following sections.

The sliding carriage 24, which has approximately the same width b' as the supporting guide track 1, has a holder 31 as the supporting element which consists of a horizontal base plate 32 with two vertical walling elements 33 and 34, which run parallel to one another, in which, in each case, pair-wise coaxial holes 35 and 36 and, as the case may be, 37 and 38 (FIG. 6) are installed to mount the shafts 25 and 26 which are provided with bearings. In this regard, the distance "a" relating to the two shafts 25 and 26, which are provided with bearings, and, as the case may be, the holes 35/36 and 37/38 accommodating them should correspond to about 1.5 times the diameter d of one of the turn-around rollers 27 through 30 which are identical among themselves.

In this way, a very small total length l of the sliding carriage 24 can be achieved which corresponds to about 2.5 times the diameter d of one of the turn-around rollers 27 through 30. The minimum adjustable length of the conveying segment 60 of the two conveyor belts 8 and 9 corresponds approximately, therefore, to the sum of twice the diameter of one of the turn-around rollers 27 through 30 and half the diameter of one of the drive rollers 18 and 19. If it is assumed that the drive rollers 18 and 19 have the same diameter d as the turn-around rollers 27 through 30, then the minimum length of the conveying segment 60 corresponds to the length "l" of the sliding carriage 24, i.e. to about 2.5 times the diameter d.

The shaft 26, which is provided with bearings and carries the second turn-around rollers 29 and 30, is mounted directly in the holes 37 and 38 of the walling elements 33 and 34 and is axially fixed in position by spacing collars 39 and 40 as well as by the securing clip-type washers 41. The shaft 25, which is provided with bearings, is mounted in the holes 35 and 36 of the holder 31 by means of two bush bearings 42. The bush bearings 42 are of identical design and are mounted, in mirror-image form relative to one another, on the shaft 25 which is provided with bearings.

Such a bush bearing 42 is shown in detail in FIGS. 7 and 8. At one end, it has a square 43 as a non-circular key-like shape to which a cylindrical bearing attachment 45 is connected which is mounted concentrically to the central hole 44; the bearing attachment is taken up in a self-centering manner, in each case, by the hole 37 and 38 as the case may be. An eccentric attachment 48 is located, in each case, on one of the clamping elements 49 between a cylindrical, somewhat wider terminal segment 46, which has a larger diameter and a radial threaded hole 47, and the bearing attachment 45 (FIGS. 3 and 6). The two bush bearings 42 are, in each case, attached to the shaft 25, which is provided with bearings, by means of grub screws 50 and are prevented from axial displacement and are, furthermore, mounted on the shaft 25, which is provided with bearings, in such a way that their cylindrical bearing attachments 45, which are concentric to the axial hole 44, sit in the holes 35 and 36 of the holder 31. As a result, the shaft 25, which is provided with bearings, is also axially fixed in position relative to the holder 31.

Two tensile clips 51 are provided as the clamping elements 49 which are mounted on the eccentric attachments 48 of the two bush bearings 42 via a cylindrical hole 52. The tensile clips 51 are, in each case, provided with squared off clamping tongues 53 which grip the longitudinal edges of the clamping strip 23 and, in this way, simultaneously project through a slotted opening 54 in the base plate 32 of the holder 31 (FIG. 3). In this way, the two tensile clips 51 simultaneously serve as guide elements for the sliding carriage 24 and for the holder 31. The base plate 32 of the holder 31 is, in addition, provided with guide tongues 63 and 64 which are directed downward, and which enclose the clamping strip 23 of the supporting guide track 1 between them in a guiding manner (see also FIG. 9).

A tensioning lever 55 is provided in order to activate the clamping elements 49 designed in the form of tensile clips 51. The lever consists of a handle which wraps around the holder 31 of the sliding carriage in a U-shaped manner. This tensioning lever 55 has two vertical side walls 56 and 57 with square openings 58, which are coaxial to one another, in order to take up the squares 43 of the two bush bearings 42 in a key-like manner which ensures rotation. In this connection, the angular arrangement of the eccentric attachment 48 is executed in such a way relative to the square 43 and, as the case may be, the square openings 58 of the tensioning lever 55 that the eccentric attachments 48 pull the clamps 53 of the two clamping elements 49 against the clamping strip 23 from beneath when the tensioning lever 55 takes up the pushed down position shown in FIG. 5 or, as the case may be, the left hand position of the sliding carriage shown in FIGS. 1 and 2. In the pushed up position, by contrast, which is shown in the right hand position of the sliding carriage in FIGS. 1 and 2, the clamping connection between the sliding carriage and the clamping strip 23 of the supporting guide track 1 is pushed upward and the sliding carriage 24 can, therefore, be displaced, in an infinitely variable manner, along the supporting guide track 1 or, as the case may be, its clamping strip 23. The loosening and fixing in place of the sliding carriage 24 at different longitudinal positions is thus possible by means of simple to and fro motions of the tensioning lever 55.

It can be seen from FIG. 1 that the sections of the conveyor belt running around the drive rollers 18 and 19 and the first turn-around rollers 27 and 28 of the sliding carriage 24 form, in each case, the actual conveying segment 60 and that the second turn-around rollers 29 and 30 of the sliding carriage 24 are mounted below this conveying segment 60. In addition, it can be seen that the conveyor belts 8 and, as the case may be, 9 are in each case led around the turn-around rollers 27 and 29 as well as 28 and 30 in a S-shaped manner and, in each case, run back from the second turn-around rollers 29 and 30 to the return rollers 6, 7 from where they return to the drive rollers 18 and 19.

The transportation of sheets of paper, which are fed onto the conveying segment 60 at the drive rollers 18 and 19 by means of a device which is not shown, takes place in the direction of the arrow 59 in a stream 61, for example, of sheets (which overlap in the form of scales) to a stack of sheets 62 which can comprise only a limited number of sheets. The individual sheets of paper can then be removed from this stack of paper sheets by means of a separating device on a continuous basis. In this way, it can be seen that the accumulation plane of the stack of sheets of paper 62 is situated at approximately the height of the upper side of the supporting guide track.

A sheet stacker in, for example, a sheet paper processing machine can, therefore, continuously handle sheets of paper using the conveying device which has been described together with an appropriately controlled drive unit.

The sliding carriage 24 can be adjusted and fixed in position in an infinitely variable manner on the supporting guide track 1 between the drive rollers 18 and 19 and the return rollers 6 and 7 so that any desired intermediate length can be arranged effortlessly between a maximum length of the conveying segment 60, which corresponds to approximately the length of the supporting guide track 1, and a minimum length of the conveying segment 60 which corresponds approximately to the length "l" of the sliding carriage 24.

While a specific embodiment of the invention has been shown and described in detail to illustrate the application of the principles of the invention, it will be understood that the invention may be embodied otherwise without departing from such principles.

What is claimed is:

1. A conveying device for sheets of paper, comprising: a substantially horizontal supporting frame including a supporting guide track which extends in a plane; a pair of drive rollers connected to a drive shaft mounted on one end of said supporting frame; a pair of return rollers mounted via bearings on a shaft at a fixed distance from said drive shaft at another end of said supporting frame, said supporting frame plane being between said return rollers and said drive rollers, with said drive rollers mounted in a drive shaft plane above said supporting frame plane of said supporting guide track; an adjustable supporting component, adjustable in a longitudinal direction of said supporting frame formed as a short sliding carriage; turn-around rollers including a pair connected to a first shaft and a pair connected to a second shaft, each of said turn-around rollers being provided with bearings mounted on said adjustable supporting component, said first shaft being located in said drive shaft plane, said adjustable sliding carriage having a length corresponding to substantially 2.5 times a diameter of one of said turn-around rollers; guiding elements for adjustably positioning said adjustable supporting component in an infinitely variable manner and clamping elements for fixing said adjustable supporting component in position on an upper side of the supporting track between said drive rollers and said return rollers, said first shaft and said second shaft of said adjustable supporting component being provided in parallel mounted a certain distance form one another corresponding to at most 1.5 times the diameter of one of said turn-around rollers; and two continuous conveyor belts, each conveyor belt cooperating with one roller of said pair of drive rollers, one roller of said pair return rollers and first shaft roller and a second shaft roller of said turn-around rollers to form a section of conveyor belt runner between the turn-around rollers and the drive rollers to form horizontal conveying segments.

2. A conveying device in accordance with claim 1, wherein said supporting guide track comprises a rectangular tube and, at its upper side, a T-shaped guide profile running in the longitudinal direction in which the clamping elements of the sliding carriage, which can be activated by means of a tensioning lever, engage in a positive gripping connection.

3. A conveying device in accordance with claim 1, wherein said sliding carriage, which is provided with approximately the same width as the supporting guide track, has a holder which comprises a horizontal base plate with two lateral, vertical walling elements, said walling elements being parallel to one another, in which said turn-around rollers first shaft and second shaft are mounted.

4. A conveying device in accordance with claim 2, wherein said sliding carriage, which is provided with approximately the same width as the supporting guide track, has a holder which comprises a horizontal base plate with two lateral, vertical walling elements, said walling elements being parallel to one another, in which said turn-around rollers first shaft and second shaft are mounted.

5. A conveying device in accordance with claim 4, wherein said clamping elements comprise two vertical tensile clips, which are, in each case, provided with a squared off clamping tongue, and are, in each case, mounted, via a suitable hole onto the eccentric attachments of two bush bearings mounted on said first shaft, between said walling elements of said holder, said tensile clips being attached to said tensioning lever in a non-slipping manner.

6. A conveying device in accordance with claim 5, wherein said tensioning lever comprises a handle which wraps around said holder of said sliding carriage in a U-shaped manner, said handle having two vertical, lateral walls, which are provided with non-round openings and are coaxial relative to one another, for the key-like accommodation of the cross sectionally adjusted attachments of said two bush bearings in a way which ensures rotation.

* * * * *